Patented Oct. 6, 1953

2,654,738

UNITED STATES PATENT OFFICE 2,654,738

ORGANIC DERIVATIVES OF PHOSPHONIC ACIDS AND METHOD OF PREPARING THE SAME

Hans Z. Lecher, Plainfield, and Erwin Kuh, New Brunswick, N. J., assignors to American Cyanamid Company, New York, N. Y., a corporation of Maine No Drawing. Application August 2, 1952,
Serial No. 302,406

18 Claims. (Cl. 260—239)

This invention relates to the preparation of new organic compounds. More particularly, it relates to phosphonic acid diamides and methods for their preparation.

In the prior art triamides of phosphoric acid have been described by Dreyfus in United States Patent 2,160,841. Certain diamides of phosphonic acids have also been described. These amides of the prior art, however, differ entirely from those of the present invention in structure and reactivity.

In our copending application, Serial Number 238,584, filed July 25, 1951, now abandoned, of which the present application is a continuation-in-part, we described certain substituted diethylenephosphondiamides. We have now found that other compounds of the same general class have similar properties.

The compounds of the present invention, in contrast to those of the prior art, are N,N'-dialkylenimides of phosphonic acids which may be illustrated by the following general formula:

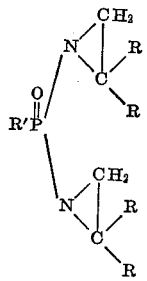

in which R is selected from the group consisting of hydrogen and lower alkyl radicals and R' is selected from the group consisting of alkyl, alkenyl, cycloalkyl and aryl radicals.

The compounds of the present invention because of the reactive ethylenimine groups are useful as new textile chemicals and may be polymerized to form new plastics. However, it is surprising that the compounds of the present invention which contain the highly reactive ethylenimine ring are so stable that they may be also used as pharmaceuticals.

The compounds of this invention are prepared by starting with a phosphonyl chloride or bromide such as, for example, ethanephosphonyl dichloride; beta-chloroethanephosphonyl dichloride; 2,2 - dimethylethenephosphonyl dichloride; butanephosphonyl dichloride; cyclohexanephosphonyl dichloride; benzenephosphonyl dichloride; 4-methylbenzenephosphonyl dichloride; 4-chlorobenzenephosphonyl dichloride; 2-naphthalenephosphonyl dichloride; 2-thiophenephosphonyl dichloride; and the like. These phosphonyl dihalides are reacted with two molecular equivalents of an ethylenimine compound which may contain one or more substituents on a ring carbon atom to produce the desired compound. This latter reaction may be illustrated by the following equation:

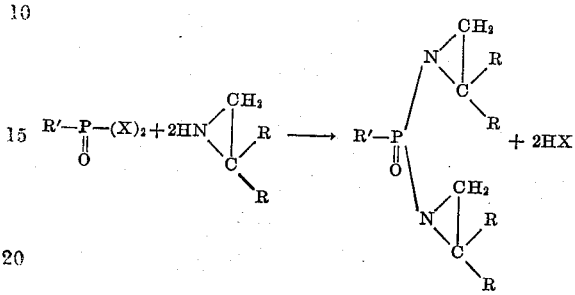

in which X is halogen and R and R' are as defined above.

The ethylenimine compound may be, for example, ethylenimine itself or a C-substituted ethylenimine such as 2-methylethylenimine; 2-ethylethylenimine; 2,2-dimethylethylenimine; 2-propylethylenimine; 2,2-diethylethylenimine; 2-hexylethylenimine; 2-ethyl-2-phenylethylenimine; 2-propyl-2-phenylethylenimine; 2-phenylethylenimine; etc. The ethylenimine intermediates may be prepared by known procedures such as treatment with sodium hydroxide of the corresponding 2-haloethylamines or the sulfuric esters of the corresponding 2-hydroxyethylamines.

The reaction to prepare the compounds of the present invention is preferably carried out in an inert organic solvent such as benzene, ether, dioxane, ethylene dichloride, and the like. It is necessary to have present as an acid acceptor a tertiary amine such as triethylamine or pyridine. With the more stable phosphonic chlorides the reaction can also be carried out in aqueous solution and under these circumstances, the acid acceptor may be an alkaline substance such as an alkali metal hydroxide or carbonate or bicarbonate. Isolation of the product from organic medium may be accomplished by filtration of the tertiary amine hydrohalide and crystallization from the organic solvent or by evaporation of the organic solvent. If prepared in aqueous medium, some members may be isolated by direct filtration. Others must be extracted from the aqueous medium with an organic solvent and subsequent evaporation of the organic solvent. The procedure will vary with the individual members according to their solubility properties.

The reaction is generally carried out at a temperature within the range of 0° C. to about 80° C. At this temperature range the reaction is generally complete within a period of several minutes to several hours.

The following examples illustrate the preparation of representative phosphonic acid diamides of the present invention. All parts are by weight unless otherwise indicated.

EXAMPLE 1

N,N'-diethylenebenzenephosphondiamide

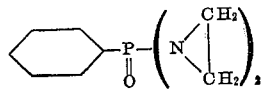

40.4 parts of triethylamine and 17.2 parts of ethylenimine are dissolved in 80 parts of benzene and cooled to 0° C. To this solution is added dropwise with agitation a mixture of 39 parts of benzenephosphonyl dichloride in 80 parts of dry benzene. The temperature is kept between 0° and 5° C. by external cooling. The addition is completed in one and three-quarters hours. The reaction mixture is then allowed to heat up to room temperature. The triethylamine hydrochloride is filtered off and the cake washed with dry benzene several times. The dry salt cake amounts to about 88% of the theoretical.

From the filtrate, the benzene is removed at low temperature in a vacuum. The viscous residue is distilled in a high vacuum. The boiling point is 117° to 120° C. at 0.2 mm. of mercury. It crystallizes spontaneously and may be recrystallized from very little benzene to obtain it as colorless plates with the melting point 75°–76.5° C., readily soluble in water, sparingly in acetone.

EXAMPLE 2

N,N'-diethylenethanephosphondiamide

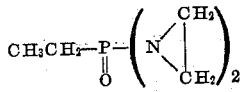

A solution of 23 parts of ethanephosphonyl dichloride in 44 parts of dry benzene is added to a solution of 32 parts of triethylamine and 14 parts of ethylenimine in 110 parts of dry benzene at a temperature between 5° and 10° C. The triethylamine hydrochloride is removed by filtration and the benzene distilled off from the filtrate under reduced pressure. The oily residue is fractionated in a vacuum and the product collected at 76°–80° C. at 0.8 mm. Hg.

EXAMPLE 3

N,N'-diethylenecyclohexanephosphondiamide

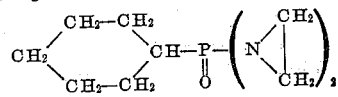

A solution of 20.1 parts of cyclohexanephosphonyl dichloride in 45 parts of dry benzene is added gradually at 6°–10° C. to a solution of 8.6 parts of ethylenimine and 22.2 parts of triethylamine in 135 parts of dry benzene. Triethylamine hydrochloride is filtered off, and benzene is removed from the filtrate by distillation under reduced pressure. The solid residue is purified by crystallization from ether. Yield, 8.7 parts; melting point 64°–66° C.

EXAMPLE 4

N,N'-diethylene-p-toluenephosphondiamide

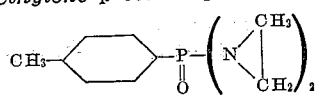

A solution of 10.4 parts of p-toluenephosphonyl dichloride in 45 parts of dry benzene is added slowly at 5°–10° C. to a solution of 4.3 parts of ethylenimine and 11.1 parts of triethylamine in 45 parts of dry benzene. The resulting triethylamine hydrochloride is filtered off and benzene is removed from the mother liquor by distillation under reduced pressure. The residual oil solidifies on cooling and is purified by several crystallizations from ether, yielding 3.5 parts of the desired product, melting point 56°–57° C.

EXAMPLE 5

N,N'-diethylene-p-chlorobenzenephosphondiamide

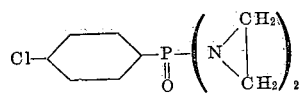

To a solution of 8.6 parts of ethylenimine and 20.2 parts of triethylamine in 88 parts of dry benzene is added with agitation 23 parts of p-chlorobenzenephosphonyl dichloride dissolved in 40 parts of dry benzene at 5°–10° C. The triethylamine salt is filtered off from the mother liquor and the benzene is removed completely in a vacuum. An almost colorless viscous liquid remains which gradually solidifies to a crystalline mass.

EXAMPLE 6

N,N'-diethylenenaphthalene-2-phosphondiamide

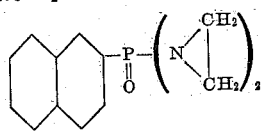

A solution of 25 parts of 2-naphthalenephosphonic acid in 110 parts of phosphorus oxychloride is added slowly with stirring to a mixture of 50 parts of phosphorus pentachloride and 110 parts of phosphorus oxychloride. The resulting slurry is heated slowly to 75° C. and held at this temperature as long as hydrogen chloride is evolved. Excess phosphorus oxychloride is removed by distillation under reduced pressure, and the oily residue is fractionated to give 24 parts of 2-naphthalenephosphonyl dichloride, boiling point 142°–143.5°/0.048 mm. Hg. Melting point is approximately 55° C.

A solution of 24.5 parts of 2-naphthalenephosphonyl dichloride in 90 parts of dry benzene is added slowly at 6°–10° C. to a mixture of 9 parts of ethylenimine, 21.2 parts of triethylamine and 90 parts of dry benzene. Triethylamine hydrochloride is filtered off and solvent removed from the mother liquor by distillation under reduced pressure. The crude product is purified by crystallization from benzene, melting point 93°–94° C.

EXAMPLE 7

N,N'-diethylene-2-methyl-1-propene-1-phosphondiamide

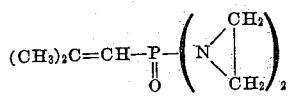

To 7,468.95 parts of anhydrous benzene in a 20 liter flask fitted with a stirrer and cooling bath, is added 2080 parts of phosphorus pentachloride. The stirred mixture is cooled to within a few degrees of the freezing point of benzene and 600 parts of isobutylene is bubbled into the mixture at a rate slow enough to keep the reaction temperature at about 12° C. while the flask is immersed in an ice-salt bath. This requires 30 to 45 minutes. To the above thick slurry of the addition product 500 parts of phosphoric anhydride is slowly added. The mixture is then heated on a steam bath at 60° C. with stirring. The solution is filtered to remove the small amount of unreacted phosphorus pentoxide and the filtrate subjected to vacuum distillation to remove benzene, hydrogen chloride and phosphorus oxychloride. This is continued until the vapor temperature reaches 80° C. at 30–40 mm. The residue is then subjected to vacuum distillation. The 2-methyl-1-propene-1-phosphonyl dichloride is a colorless liquid having a boiling point of 99°–101° C. at 17 mm.

A solution of 17.3 parts of 2-methyl-1-propene-1-phosphonyl dichloride in 45 parts of dry benzene is added slowly at 6°–10° C. to a mixture of 8.6 parts of ethylenimine, 22.2 parts of triethylamine and 135 parts of dry benzene. Triethylamine hydrochloride is filtered off and the solvent removed from the mother liquor by distillation under reduced pressure. The residual oil is purified by fractionation. The boiling point is 96° C. at 0.7 mm. Hg. Yield, 5.5 parts.

We claim:

1. Compounds of the group having the general formula:

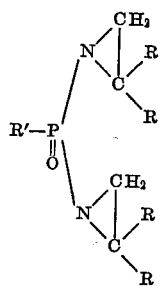

in which R is a member of the group consisting of hydrogen and lower alkyl radicals and R' is selected from the group consisting of alkyl, alkenyl, cycloalkyl and aryl radicals.

2. Compounds of the group having the general formula:

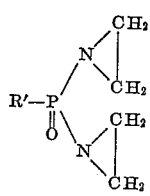

in which R' is a monocyclic aryl radical.

3. N,N' - diethylene - benzenephosphondiamide having the formula:

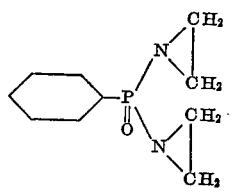

4. N,N' - diethyleneethanephosphondiamide, having the formula:

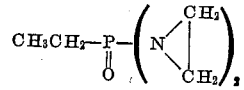

5. N,N' - diethylenecyclohexanephosphondiamide having the formula:

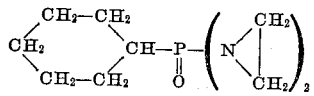

6. N,N' - diethylene - p - toluenephosphondiamide having the formula:

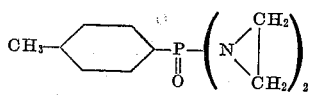

7. N,N' - diethylene - p - chlorobenzenephosphondiamide having the formula:

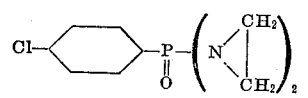

8. N,N' - diethylenenaphthalene - 2 - phosphondiamide having the formula:

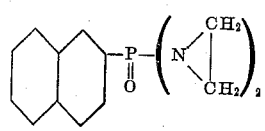

9. N,N' - diethylene - 2 - methyl - 1 - propene-1-phosphondiamide having the formula:

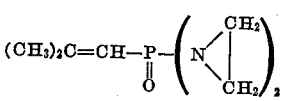

10. A method of preparing compounds having the formula:

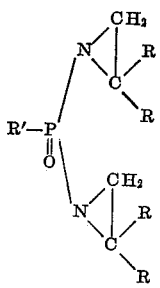

in which R is a member of the group consisting of hydrogen and lower alkyl radicals and R' is selected from the group consisting of alkyl, alkenyl, cycloalkyl and aryl radicals which comprises reacting a compound having the formula:

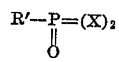

in which X is halogen of the atomic number between 17 and 35 and R' is as defined above with a compound having the formula:

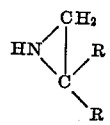

in which R is as defined above, and recovering said compound therefrom.

11. A method of preparing compounds having the formula:

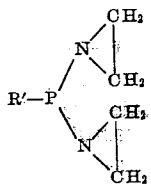

in which R' is a monocyclic aryl radical which comprises reacting a compound having the formula:

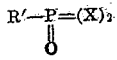

in which X is halogen of the atomic number between 17 and 35 and R' is as defined above, with ethylenimine, and recovering said compound therefrom.

12. A method of preparing N,N'-diethylene-benzenephosphondiamide which comprises reacting benzenephosphonyl dichloride with ethylenimine in an inert organic solvent in the presence of a tertiary amine and recovering said compound therefrom.

13. A method of preparing N,N'-diethylene-thanephosphondiamide which comprises reacting ethanephosphonyl dichloride with ethylenimine in an inert organic solvent in the presence of a tertiary amine and recovering said compound therefrom.

14. A method of preparing N,N'-diethylene-cyclohexanephosphondiamide which comprises reacting cyclohexanephosphonyl dichloride with ethylenimine in an inert organic solvent in the presence of a tertiary amine and recovering said compound therefrom.

15. A method of preparing N,N'-diethylene-p-toluenephosphondiamide which comprises reacting p-toluenephosphonyl dichloride with ethylenimine in an inert organic solvent in the presence of a tertiary amine and recovering said compound therefrom.

16. A method of preparing N,N'-diethylene-p-chlorobenzenephosphondiamide which comprises reacting p-chlorobenzenephosphonyl dichloride with ethylenimine in an inert organic solvent in the presence of a tertiary amine and recovering said compound therefrom.

17. A method of preparing N,N'-diethylene-naphthalene-2-phosphondiamide which comprises reacting naphthalene-2-phosphonyl dichloride with ethylenimine in an inert organic solvent in the presence of a tertiary amine and recovering said compound therefrom.

18. A method of preparing N,N'-diethylene-2-methyl-1-propene-1-phosphondiamide which comprises reacting 2-methyl-1-propene-1-phosphonyl dichloride with ethylenimine in an inert organic solvent in the presence of a tertiary amine and recovering said compound therefrom.

HANS Z. LECHER.
ERWIN KUH.

No references cited.